United States Patent [19]

Mullin

[11] Patent Number: 5,295,556
[45] Date of Patent: Mar. 22, 1994

[54] MULTIPURPOSE HUNTING CART

[76] Inventor: Daniel J. Mullin, 10400 Hage Dr., Rogers, Minn. 55374

[21] Appl. No.: 923,652

[22] Filed: Aug. 3, 1992

[51] Int. Cl.$^5$ .............................................. A45F 3/26
[52] U.S. Cl. .................... 182/187; 182/129; 182/116; 182/20
[58] Field of Search ............... 182/187, 188, 116, 129, 182/20; 43/1; 135/901; 280/30, 47.18, 47.34, 47.24

[56] References Cited

U.S. PATENT DOCUMENTS

| | | | |
|---|---|---|---|
| 3,545,786 | 12/1970 | Yoder | 280/47.24 |
| 3,630,314 | 12/1971 | Bamburg | 182/116 |
| 3,684,307 | 8/1972 | Bourgraf et al. | 280/47.24 X |
| 3,799,609 | 3/1974 | Smutny et al. | 135/901 X |
| 4,582,165 | 4/1986 | Latini | 182/20 |
| 5,009,283 | 4/1991 | Prejear | 182/187 X |
| 5,016,732 | 5/1991 | Dunn | 182/116 |

FOREIGN PATENT DOCUMENTS

| | | | |
|---|---|---|---|
| 1344461 | 10/1983 | France | 182/20 |
| 2058882 | 4/1981 | United Kingdom | 280/47.18 |

Primary Examiner—Alvin C. Chin-Shue
Attorney, Agent, or Firm—Haugen and Nikolai

[57] ABSTRACT

A multipurpose hunter's apparatus convertible between a wheeled cart, a sled, a tree stand, and a free standing deer stand. The apparatus comprises a pair of L-shaped frame members separated by a plurality of rungs to provide a ladder when in the elevated position, or as brace members when used as a transporting device. A unique arrangement of three braces can be used in various configurations to rigidly stabilize the respective arrangement and to provide a load retaining member when transporting game or hunter's equipment. A handle is adaptable to the wheeled carts and the sled arrangements which is adapted to a snowmobile or an all terrain vehicle. Various members are multipurpose in function such that various devices can be arranged, with a minimal amount of material. The apparatus can be transportable in a boat across open water, and can be arranged to carry the boat between portages. From start to finish of a hunting trip, the apparatus can be figured into the variety of useful orientations as appropriate. Finally, the free standing deer stand can include a tarp disposed thereon to provide a shelter for the hunter which is camouflaged. A hunter can reside in the shelter in either an elevated hunting position or a ground level tent position depending on the need.

12 Claims, 3 Drawing Sheets

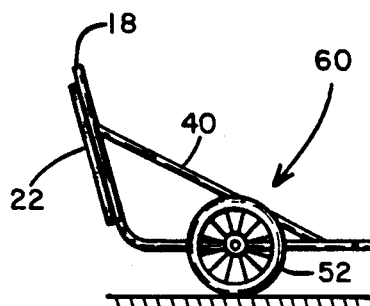
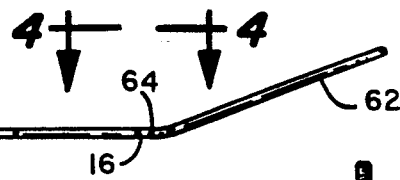
Fig. 3
Fig. 4
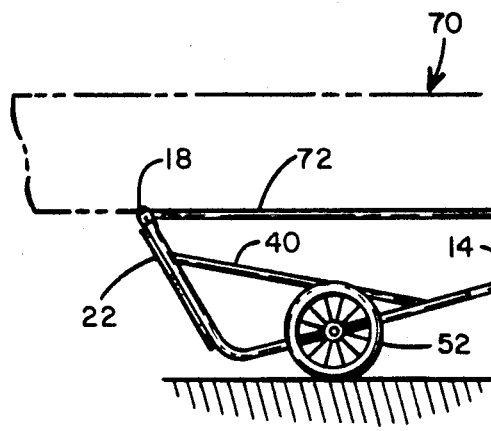
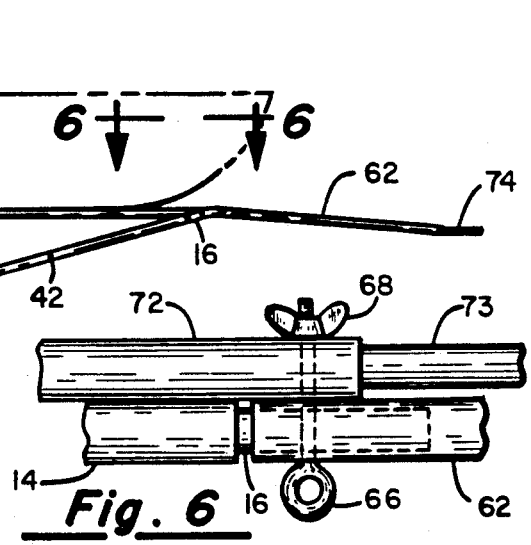
Fig. 5
Fig. 6
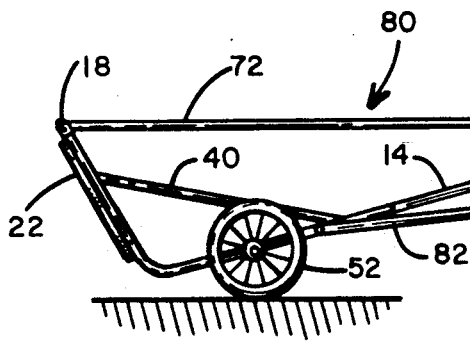
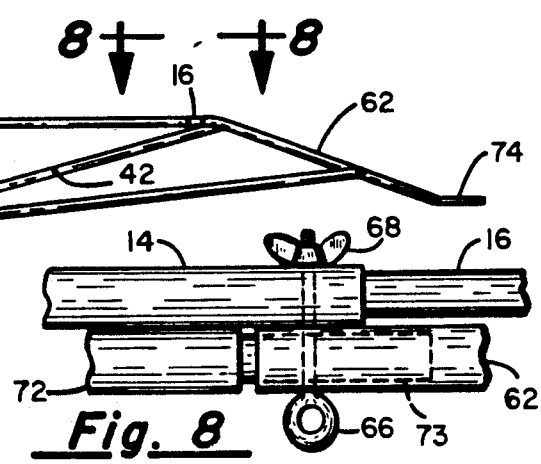
Fig. 7
Fig. 8

MULTIPURPOSE HUNTING CART

BACKGROUND OF THE INVENTION

I. Field of the Invention

The present invention relates generally to game hunting apparatuses, and more particularly to carts for transporting game and equipment which are readily convertible to an elevated stand and camouflaged shelter.

II. Discussion of the Prior Art

Tree stands are often utilized by hunters when hunting large game such as deer to obtain an elevated hunting platform. Tree stands provide hunters with unobstructed views of a broad area of the woods. Stands also provide hunters with the ability to camouflage themselves above ground level, and further, are less likely to be scented by an animal since the hunter would be elevated above ground level.

Hunters often hunt in remote locations which are not easily accessible by motor vehicles, and thus, transporting hunted game back to cars is a laborious task. Further, hunting equipment can be heavy and inconvenient to transport to a hunting location. Finally, snow covered ground is often encountered during various hunting months. Thus, carts are a desirable item to accommodate transporting hunting equipment and returning the hunted game back to the truck.

Hunters are well known for their heartiness to hunt in all types of weather. Hunters are known for their heartiness. During the fall months, cold and rainy weather is often endured. While hunters are often tolerant of foul weather, and often carry along rain gear, a sheltered stand is highly desirable.

U.S. Pat. No. 5,064,020 to Eagleson teaches a device for hunting large and small game. This device teaches a hunting device that is selectively convertible between a tree stand, a ground level camouflage position, and a hand operated cart. This device is collapsible about hinge to portions, and has selectively attachable wheels for transporting game. However, it is not well suited for transporting larger equipment such as canoes or duck boats. Further, the shelter taught is formed only at ground level for hunting small game.

U.S. Pat. No. 3,282,375 to Ray teaches a mobile stand for hunters which is convertible to a wheeled hand cart. This device is not well suited for transporting larger equipment such as canoes or duck boats. Further, the device is not configurable to an elevated free standing shelter.

U.S. Pat. No. 4,045,040 to Fails teaches a deer stand and game carrier. This device comprises telescoping members wherein the frame can be converted to a stand. However, this device is not suited to transport equipment, such as heavy game or hunting equipment, but rather teaches a device adapted to a backpack of the hunter to be dragged behind a hunter.

U.S. Pat. No. 3,336,999 to McSwayne teaches a hunting stand. The hunting stand is foldable into a compact arrangement. The device can also be converted to a litter carrying device, however, the device is typically transported as a suitcase. This device fails to teach a free standing structure arrangement.

While various features are contemplated by other patents individually, each having corresponding advantages, they each also have limitations such that each is designed only for particular applications.

Thus, a multipurpose cart or sled which can carry larger equipment such as canoes, small fishing boats, and duck boats, and further, which can be converted to a free standing platform and also as an elevated shelter is highly desirable.

OBJECTS

It is accordingly a principle object of the present invention to provide a multipurpose hunting apparatus which can be converted to a variety of configurations.

One principle object of the present invention is to provide a wheeled cart for transporting larger equipment such as canoes, small fishing boats, duck boats and hunting equipment and which is also adapted to carry large game back from the woods to a truck.

Another principle object of the present invention is to provide an apparatus which can be configured to a sled for transporting gear across a snow covered ground.

A further object of the present invention is to provide an apparatus which can be configured as a dolly to transport large and heavy equipment such as an outboard motor.

Yet a further object of the present invention is to provide an apparatus which can be quickly converted to an elevated platform which is braced against a tree for hunting deer or photographing wild life.

A yet further object of the present invention is to provide an apparatus which can be converted to a rigid free standing platform.

A yet further object of the present invention is to provide an apparatus which can be converted to an elevated camouflaged shelter, or covered to provide a tent or ice fishing shelter.

SUMMARY OF THE INVENTION

The foregoing features and objects are achieved by providing a multipurpose hunter's apparatus selectively configurable as a cart or a sled for transporting large equipment and game, and which can be converted to a free standing elevated platform and camouflaged shelter. The apparatus comprises a frame defined by a first and second elongated member, wherein each member has a bent portion to form an L-shape. Each member is approximately equal in length and disposed parallel to one another. The frame includes a plurality of longitudinally spaced cross bars secured to and extending between each elongated member to serve as ladder rungs. The first and second members each extend from a first end to a second end proximate the bent portion. Detachable wheels are rotatably connected to the frame proximate the bent portions of the elongated members. A first brace is selectively connected to each member in a first position such that it extends between a portion of the respective member proximate the first end and a portion of the respective member proximate the second end. Thus, the preferred embodiment of the present invention comprises a cart having a brace adapted to the frame to allow the apparatus to carry large and heavy equipment, such as duck boats and canoes, which is balanced over the wheels. The cart can also carry large game, and can include a handle such that it can be towed by a vehicle, such as an all terrain vehicle or easily pulled by a hunter. Finally, the wheels can be removed such that the cart can be stood upon the first ends of each elongated member such that the apparatus can be leaned against a tree to serve as a platform.

In an alternative embodiment, the present invention can be configured as a free-standing hunters stand. Each first brace can be connected in a second position to the respective L-shaped member such that each first brace is connected to the respective member proximate the first end and extends away from the second end of the respective frame member. The apparatus further comprises a second brace secured to and extending between a midportion of each member and a midsection of the respective first brace. The apparatus further comprises a support extending between the first and second elongated members proximate the respective first ends such that the apparatus can be stood upon both the second ends of each of the elongated members of the frame and the first braces to form a free-standing deer stand. Thus, the apparatus forms a four legged frusto-pyramid shaped free standing deer stand. A guard rail can be selectively attached to the support extending upwardly to restrain a hunter upon the support in an elevated position. Further, a tarp can be disposed over and/or about the apparatus which is detailed to camouflage the deer stand platform and guardrail. A tarp can also be disposed about the frame to create a tent-type shelter.

A yet further alternative embodiment of the present invention includes skis selectively attached to the frame when the wheels are removed for facilitating transport of the apparatus on snow covered ground. Thus, the cart can either include wheels for land mobility or skis for mobility upon land having a snow cover or over frozen lakes.

BRIEF DESCRIPTION OF THE DRAWINGS

FIG. 3 illustrates a side view of the present invention configured as a cart further including a U-shaped handle extending upwardly from the plane the elongated members extend in. This facilitates a hunter pulling the cart wherein the long portions of the frame members reside in a horizontal plane;

FIG. 4 is a view 4—4 shown in FIG. 3 illustrating the attachment of the U-shaped handle to the frame of the cart;

FIG. 5 illustrates a side view of the invention configured as a cart adapted to transport large equipment such as a canoe or a duck boat. A second brace is adapted to the cart for structural integrity, where the U-shaped handle is extending downward such that the second brace lies in a horizontal plane;

FIG. 6 is a view 6—6 shown in FIG. 5 illustrating the U-shaped handle adapted to the frame and the second brace;

FIG. 7 illustrates a side view of the present invention configured as a cart wherein the second brace extends between the frame and the U-shaped handle to facilitate being towed by a vehicle;

FIG. 8 is a view 8—8 shown in FIG. 7 illustrating the U-shaped handle connected to the frame of the cart and the second brace;

The foregoing features, objects, and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
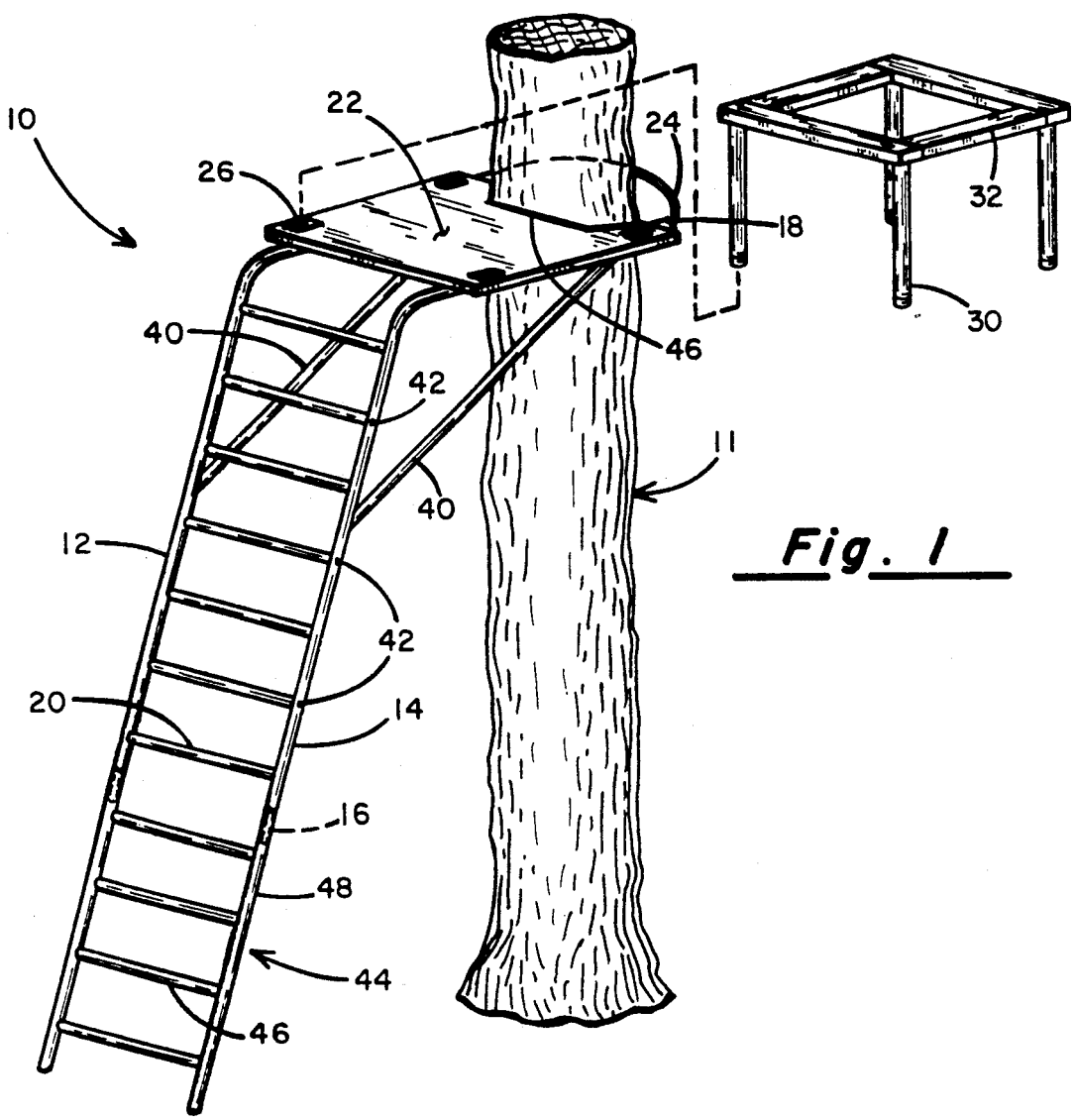
FIG. 1 illustrates the present invention configured in an upright elevated position leaning toward a tree to form a deer stand.

Referring to FIG. 1, the convertible hunting apparatus according to the preferred embodiment of the present invention is configured as an elevated tree stand leaning against and secured to a tree and indicated generally at 10. Apparatus 10 comprises a frame having a rigid first and second L-shaped side member 12 and 14, respectively, each preferably comprised of steel or aluminum. Each member 12 and 14 extends from a first end 16 to a second end 18 proximate the bent portion of each respective member 12 and 14. A plurality of rigid rungs 20 extend transverse to each of members 12 and 14 and are secured therebetween to serve as rungs and provide a ladder. Rungs 20 each extend through the walls of members 12 and 14 and welded such that if a weld fails, the respective rung remains constrained by the respective member. A rigid planer platform 22 is secured to and extends between members 12 and 14 proximate the bent portions of each member 12 and 14 and respective ends 18. Platform 22 is strong and can support the weight of an elevated hunter. Steel, aluminum, or plywood has been found to be suitable for platform 22. A ratcheting strap 24 forms a loop about the tree and extends from each end 18 of respective members 12 and 14. Strap 24 securingly holds stand 10 to the tree and can be disconnected from either end 18 to facilitate removal from the tree. A chain and lock arrangement (not shown) can also be adapted to ends 18 to deter theft. Platform 22 comprises four threaded apertures 26, one in each corner. A guard rail 30 comprising four vertical legs comprised of pipes each threaded at a lower end is adapted to be threadably received in each respective threaded aperture 26 in platform 22. This rail serves as a safety rail for the elevated hunter in either a tree leaning (FIG. 1) or free standing position (FIG. 11), and also can be designed tall enough such that a camouflaged tarp 106 (see FIG. 11) can be wrapped about a rail 32 to provide an elevated shelter.

A separate rigid first brace member 40, also comprised of steel or aluminum, is secured to and extends between a midsection of each respective side member 12 and 14, and the second end 18 of the respective frame member. Thus, the frame is rigidly reinforced to support a hunter upon platform 22.

Each frame member 12 and 14 also includes three evenly spaced apertures 42 each opening into an adjacent rung 20 for receiving axles to facilitate adapting skis or wheels to the frame members 12 and 14 as will be described shortly.

Platform 22 has a notched portion 46 adapted to abut the tree which in combination with chain 24 securely adapts apparatus 10 to the tree.

A steel or aluminum extension handle 44 having a plurality of rungs 46 is adaptable to ends 16 of each frame member 12 and 14. Each end 48 of handle 44 is hollowed for receiving end 16 in a friction fit. A length of five feet is preferred, but limitation to this length is not to be inferred.

Figure 2:
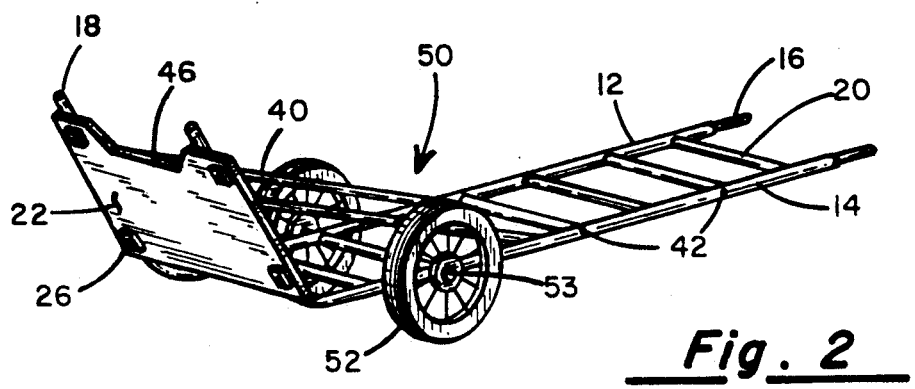
FIG. 2 illustrates the present invention configured as a cart with wheels attached to the frame proximate the bent portion of each side member for transporting game or equipment.

Referring to FIG. 2, the present invention is configured as a cart or dolly 50 for transporting large and heavy game or equipment, such as an outboard motor. Ends 16 of each member 12 and 14 have a reduced diameter and serve as handles such that a hunter can maneuver and pull cart 50. A pair of wheels 52 are selectively and rotatably attached to each respective frame member 12 and 14 to provide the cart arrangement. Wheels 52 are sufficiently large and sturdy enough to support heavy game which can easily exceed 200 pounds. Twenty-inch wheels have been found to be acceptable, however, limitation to this size is not to be inferred. Each wheel 52 is coupled to one another via an axle having an elongated head 53 at one end and an aperture defined transversely therethrough at the other end for receiving a cotter pin which secures a washer against a respective wheel bearing (not shown). The axle extends between and beyond each frame member 12 and 14 through an adjacent rung 20 via aperture 42 proximate the bent portion of each frame member 12 and 14. Wheels 52 also facilitate transporting the apparatus to a hunting location in the woods, whereupon the wheels 52 may or may not be removed, the frame can then be elevated against the tree to serve as an elevated platform, as shown in FIG. 1.

Referring to FIG. 3, the cart shown in FIG. 2 is configured in horizontal position as indicated at 60. A U-shaped handle 62 is adapted to each end 16 of each side member 12 and 14 and extends upwardly at an acute angle from the ground, preferably at 30 degrees. Each end of handle 62 is hollowed having a bent end 64 securingly attached to respective end 16 of each frame member 12 and 14. As shown in FIG. 4, handle 62 is hollow and receives respective end 16 of a smaller diameter. An eye bolt 66 extends through a corresponding aperture defined in both end 16 and handle 62 in a transverse direction, wherein a wing nut 68 is threadably received to securely fasten handle 62 to members 14 and 16.

Referring to FIG. 5, the invention is selectively configured as a cart 70 such that U-shaped handle 62 is rotated 180 degrees and angled downward and adapted to each end 16 of each member 12 and 14 as shown. A separate second rigid brace 72 extends from each end 18 of each member 12 and 14 proximate platform 22 to each respective frame member 12 and 14 proximate end 16 as shown. This configuration allows cart 70 to be transported by a hunter wherein brace member 72 is in the horizontal position. This facilitates transporting a larger and heavier piece of equipment, such as a canoe, fishing boat, or duck boat, wherein the weight of the boat can be evenly distributed over wheel members 52, thus providing a balanced cart as the hunter transports the boat, such as between portages. Both brace members 40 and 72 structurally reinforce the cart to support the heavy load. A unique feature of cart 70 is that little weight is sensed by the hunter when lifting handle 62. Handle 62 can also be adapted with an optional trailer hitch 74 for connection to an all terrain vehicle or snowmobile. Here, the boat can be shifted forward toward handle 62 to increase the tongue weight.

Referring to FIG. 6, a separate eye bolt 66 extends through handle 62, end 16 of respective frame member 12 or 14, and through brace member 72 wherein wing nut 68 securely fastens the arrangement. Again, each end 16 of each respective member 12 or 14 extends into handle 16 which has a hollowed end as shown. The outer diameter of handle 16 closely conforms to the inner diameter of the hollow tube of handle 62.

Referring to FIG. 7, the apparatus is shown in FIG. 5 is modified and configured as a cart 80, wherein a third brace member 82 is selectively connected between a midsection of each respective members 12 and 14 proximate wheels 52 and a midsection of handle 62 using bolts inserted through apertures defined in respective members. Each brace 72 is still securingly positioned between end 18 and end 16 of respective members 12 and 14, but in a modified way (FIG. 8), and has an end 73 of reduced diameter inserted in handle 62. Referring to FIG. 8, brace 72 is parallel to respective member 12 or 14 and is securingly attached via eye bolt 66 and wing nut 68 as shown. Eye bolt 66 extends through apertures in both respective members 12 or 14 and brace 72, wherein handle 62 receives respective ends 73 of braces 72.

Referring again to FIG. 7, when cart 80 is transported members 12 and 14 are angled upward at and angle of approximately 30 degrees with respect to the ground wherein each brace 72 and 82 is substantially horizontal. This allows a heavy load, such as a boat or canoe, to have the weight evenly distributed over wheel 52 thus reducing the downward force exerted on the hunter at handle 62. The combination of braces 40, 72 and 82 as shown provide a rigid and strong structure ideally suited for carrying heavy loads between portages. Again, cart 80 can be adapted with trailer hitch 74 to facilitate towing.

Figure 9:
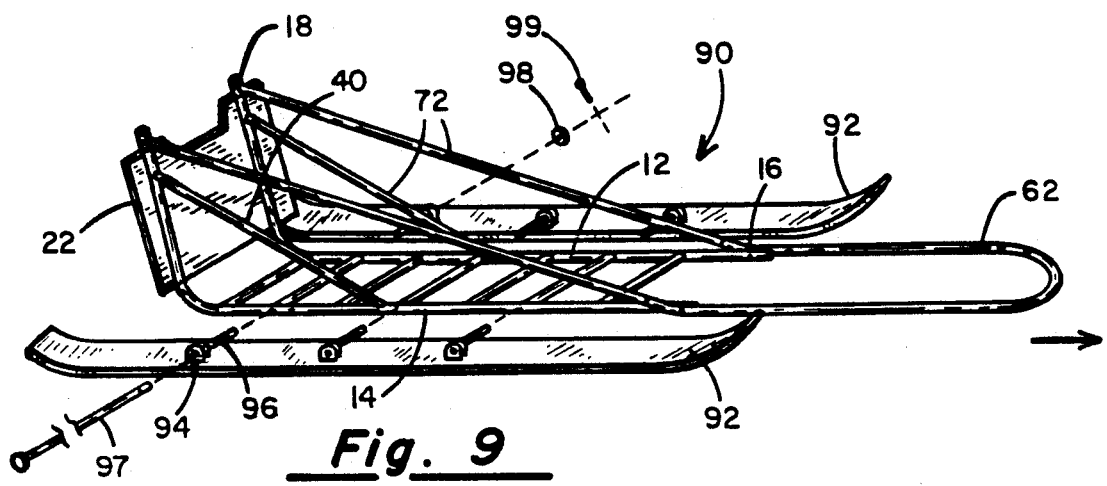
FIG. 9 illustrates a perspective view of the present invention configured as a sled comprising skis attached to each side member of the frame.

Referring now to FIG. 9, another configuration of the present invention is shown configured as a sled 90. This arrangement of each brace 72 in combination with each member 12 and 14, similar to that shown in FIG. 4, includes handle 92 receiving an end of respective braces 72 and secured with eye-bolts 66 and wing nuts 68. Sled 90 comprises a pair of skis 92 each having three equally spaced U-shaped brackets 92 extending upwardly from an upper surface of each ski 92. Each bracket 94 has a sleeve 96 extending laterally therethrough for receiving an elongated rod 97, and is adapted to secure the respective ski 92 to respective member 12 and 14 via holes 42 defined therein as previously discussed. Elongated rod 97 is extending through sleeve 96 defined through each bracket 94, through corresponding apertures 42 in each of members 12 and 14 and in the adjacent rung 20 therebetween, and out again through the sleeves 96 defined in the respective brackets 94 of the opposing ski 92. Three rods 97 extend transverse to each of members 12 and 14 and parallel to one another within a respective rung 20 corresponding to the associated aperture 42 and brackets 94. Rods 97 have an enlarged head on one end, and have an aperture defined transversely therethrough at the other end for receiving a cotter pin 99 which secures a washer 98 against the bracket 94 such that each ski 92 is secured to each respective member 12 and 14. As shown, sled 90 provides a horizontal surface for pulling equipment and game over a snow covered ground. Braces 40 and 72 as connected between appropriate sections of the respective members 12 and 14 provide a rigid frame such that any shifting of weight rearward would not damage sled 90. Handle 62 can either be gripped by the hunter for towing, or connected to an all terrain vehicle or snowmobile (not shown). Platform 22 at the rear portion of the sled provides a rear wall such that the load will not shift off sled 90 during transportation. Further, each brace 40 and 72 serve as side retaining braces such that the load cannot shift laterally. This combination as shown in FIG. 9 can be quickly configured since each ski 92, handle 62 and brace 72 can be secured in the appropriate position quickly.

Figure 10:
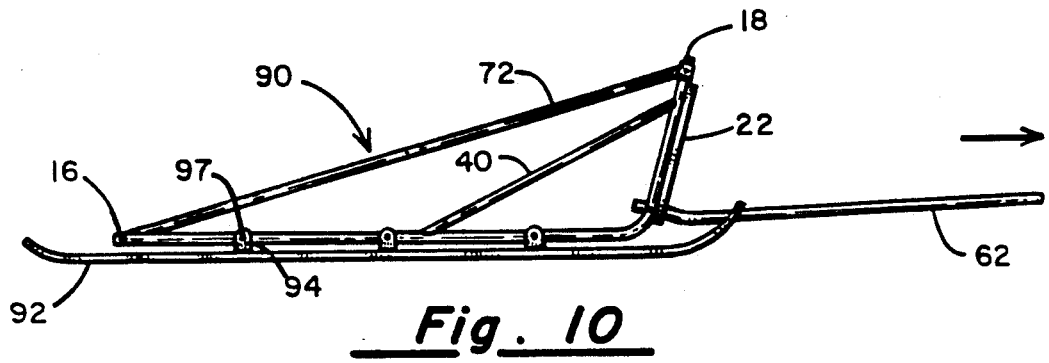
FIG. 10 illustrates a side view of the present invention configured as a sled having the U-shaped handle configured to the frame at an end opposite as shown in FIG. 9.

Referring to FIG. 10, an alternative arrangement of the sled 90 shown in FIG. 9 is shown. Here, the difference is the skis are reversed and the handle 62 is secured to each member 12 and 14 through corresponding holes such that the sled 90 can be towed rearward as shown. Braces 40 and 72 serve as stabilizers and as side retaining members in combination with platform 22 to prevent a load from shifting when transported. Again, in this arrangement handle 62 can be adapted to a snowmobile or an all terrain vehicle. Platform 22 at the front of the sled keeps snow from a snowmobile from being thrown into the sled.

Figure 11:
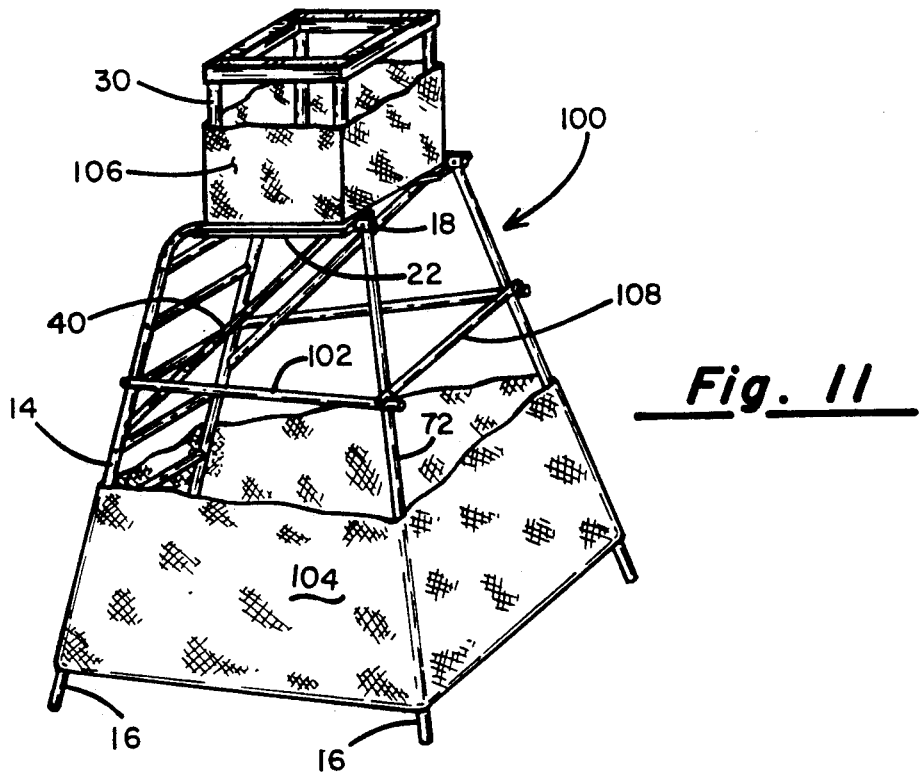
FIG. 11 illustrates the present invention configured as a free standing elevated stand. The brace extends outwardly from the frame with a third brace connected therebetween for stability.

Referring to FIG. 11, a yet further embodiment of the present invention is shown configured as a free standing deer stand 100. Here, each second brace 72 is connected at one end to each respective end 18 of each member 12 and 14 using eye-bolts 66 and wing nuts 68, wherein each second brace 72 is extended away from each member 12 and 14 and each other down towards the earth. A pair of equal length rigid third braces 102 are each securely connected between a respective midsection of members 12 and 14 and the opposite respective second brace 72 at a midsection thereof. Brace 102 is connected via an eye-bolt and wing nut arrangement at opposite ends to apertures defined in each respective second brace 72 and the respective members 12 and 14. Thus, each third brace 102 is parallel to the ground and provides an A-shaped and trapezoidal structure in combination with each respective members 12 and 14 and respective second braces 72. Further reinforcement is provided by a fourth brace 108 securingly fastened to and extends between each brace 72 proximate each brace 102. Brace 108 is secured using an eye-bolt and wing nut arrangement to apertures defined in both braces 72 and brace 108. First brace 40, as previously discussed, provides further reinforcement to the structure such that free standing deer stand 100 is rigid and secure enough to support a hunter. Rail 30 can be adapted to platform 22 as previously discussed in reference to FIG. 1. Rungs 20 defined between each members 12 and 14, as shown in FIG. 1, provide steps of a ladder such that the hunter can climb up to platform 22. A camouflaged tarp 104 can be secured about a periphery of stand 100 to provide a tent-like shelter beneath platform 22. A camouflaged tarp 106 can also be disposed over rail 30 as previously discussed in reference to FIG. 1 to provide a smaller elevated camouflaged shelter. Thus, the hunter can be elevated and sheltered, or at ground level and sheltered. Again, this free standing deer stand is easy to set up and can be quickly converted back to a sled or a wheeled cart for transportation back to a truck.

Each of the various configurations shown in the previously discussed figures can be quickly disassembled such that the entire apparatus can be placed in the center of a boat and transported across water to a portage. Each of the members is multipurpose and adapted to provide various configurations shown in FIGS. 1-11. Each members 12 and 14 in combination with rungs 20 provide a ladder as shown in FIG. 1, but also serve as a load carrying surface as shown by the wheeled carts in FIGS. 2-8, and in the sleds shown in FIGS. 9-10. Second brace 72 can serve as a brace and load support for a boat as shown in FIG. 5, as a brace as shown in FIG. 7 for elevating and balancing a load over the wheel 52, or as a support member for a free standing deer stand shown in FIG. 11. Platform 22 can serve as a support to elevate a hunter as shown in FIGS. 1 and 11, or as a rear load retaining member as shown in carts in FIGS. 2-8 and in sled arrangements shown in FIGS. 9-10.

This invention has been described in this application in considerable detail in order to comply with the Patent Statutes and to provide those skilled in the art with the information needed to apply the novel principles and to construct and use such specialized components as are required. However, it is to be further understood that the invention can be carried out by specifically different equipment and devices and that various modifications, both as to equipment details and operating procedures, can be accomplished without departing from the scope of the invention itself.

I claim:

1. A selectively convertible hunter's apparatus, comprising:
   (a) a frame defined by a first and second elongated member each having a bent portion to form an L-shape and of approximately equal length and disposed substantially parallel to one another, said frame having longitudinally spaced cross bars secured to and extending between each said member, said first and second members each extending between a respective first end nearest the respective bent portion and a second end, said first and second members each having a first segment defined between said respective first end and said bent portion and a second segment defined between said bent portion and said second end, wherein said second segment is substantially longer than said respective first segment;
   (b) first brace member selectively connectable in a first position to said frame and extending generally linearly between a portion of said frame at said first end of said first member and a portion of said frame at said second end of said first member; and
   (c) detachable wheel means rotatably connected to said frame closely proximate said bent portions of said elongated members to form a cart.

2. The apparatus as specified in claim 1 further comprising handle member selectively attachable to said second ends of said elongated members.

3. The apparatus as specified in claim 2 wherein said handle means has a bent portion such that said first brace member can be oriented in a position parallel to the ground when a person grips said handle means to transport said apparatus.

4. The apparatus as specified in claim 2 further comprising second brace means extending between a midsection of said elongated members and said handle means.

5. The apparatus as specified in claim 1 wherein said first braces member is selectively connectable in a second position such that said first brace member is connected to each said elongated member proximate said first ends and extends away from said second ends of said elongated members, said apparatus further comprising second brace member secured to and extending between a midportion of each said elongated members and a midsection of said first brace member, said apparatus further comprising support means between said first and second members proximate said respective first ends such that said apparatus can be stood upon said second ends of said elongated members and said first brace member to form a free-standing deer stand.

6. The apparatus as specified in claim 5 further comprising tarp means disposed about said stand to form a tent-type shelter.

7. The apparatus as specified in claim 5 further comprising guard rail means selectively attached to said support means.

8. A selectively convertible hunter's apparatus, comprising:
(a) a frame defined by a first and second elongated member each having a bent portion to form an L-shape and of approximately equal length and disposed substantially parallel to one another, said frame having longitudinally spaced cross bars secured to and extending between each said member, said first and second members each extending between a respective first end nearest the respective bent portion and a second end, said first and second members each having a first segment defined between said respective first end and said bent portion and a second segment defined between said bent portion and said second end, wherein said second segment is substantially longer than said respective first segment;
(b) first brace member selectively connectable in a first position to said frame and extending generally linearly between a portion of said frame at said first end of said first member and a portion of said frame at said second end of said first member; and
(c) ski means selectively attached to and substantially parallel with each said elongated members to form a sled.

9. The apparatus as specified in claim 8 further comprising handle means selectively connected to said frame.

10. The apparatus as specified in claim 8 wherein said first braces member is selectively connectable in a second position such that said first brace member is connected to each said elongated member proximate said first ends and extends away from said second ends of said elongated members, said apparatus further comprising a second brace member secured to and extending between a midportion of each said elongated members and a midsection of said first brace member said apparatus further comprising support means between said first and second members proximate said respective first ends such that said apparatus can be stood upon said second ends of said elongated members and said first brace member to form a free-standing deer stand.

11. The apparatus as specified in claim 8 further comprising tarp means disposed about said stand to form a shelter.

12. The apparatus as specified in claim 8 further comprising support means extending between said first and second members proximate said respective first ends, and guard rail means selectively attached to said support means.

* * * * *